No. 711,825. Patented Oct. 21, 1902.
P. B. CLARKE.
WINCH.
(Application filed Jan. 26, 1901.)
(No Model.) 7 Sheets—Sheet 1.

Fig. 1.

P. B. CLARKE, Inventor

Witnesses

No. 711,825. Patented Oct. 21, 1902.
P. B. CLARKE.
WINCH.
(Application filed Jan. 26, 1901.)
(No Model.) 7 Sheets—Sheet 3.

P. B. CLARKE, Inventor

No. 711,825. Patented Oct. 21, 1902.
P. B. CLARKE.
WINCH.
(Application filed Jan. 26, 1901.)
(No Model.) 7 Sheets—Sheet 5.

P. B. CLARKE, Inventor

No. 711,825. Patented Oct. 21, 1902.
P. B. CLARKE.
WINCH.
(Application filed Jan. 26, 1901.)
(No Model.) 7 Sheets—Sheet 7.

Fig. 11.

P. B. CLARKE
Inventor

Witnesses

By Attorneys

UNITED STATES PATENT OFFICE.

PEETE B. CLARKE, OF NEW YORK, N. Y.

WINCH.

SPECIFICATION forming part of Letters Patent No. 711,825, dated October 21, 1902.

Application filed January 26, 1901. Serial No. 44,781. (No model.)

*To all whom it may concern:*

Be it known that I, PEETE B. CLARKE, a citizen of the United States, residing at New York, in the county of New York and State of New York, have invented a new and useful Winch, of which the following is a specification.

The invention relates to improvements in winches.

The object of the present invention is to improve the construction of winches and to provide a simple and efficient one having a plurality of drums and adapted to be connected with a series of ropes or other flexible con15 nections to a pair of adjustable and extensible chutes mounted on and located above a barge and adapted to be turned in any direction and to be arranged at any desired elevation.

A further object of the invention is to enable any one of the drums to be rotated independently of the other for paying out or winding up any one of the flexible connections for lengthening or shortening or raising or lower25 ing one of the chutes.

The invention consists in the construction and novel combination and arrangement of parts hereinafter fully described, illustrated in the accompanying drawings, and pointed out in the claims hereto appended.

In the drawings, Fig. 6 is an enlarged detail view of one of the chutes. Fig. 9 is a detail view of one of the clutch-engag45 ing levers. Fig. 10 is a similar view of one of the foot-levers. Fig. 12 is a detail sectional view of the upper end of one of the chutes.

Like numerals of reference designate cor50 responding parts in all the figures of the drawings.

Figure 1:
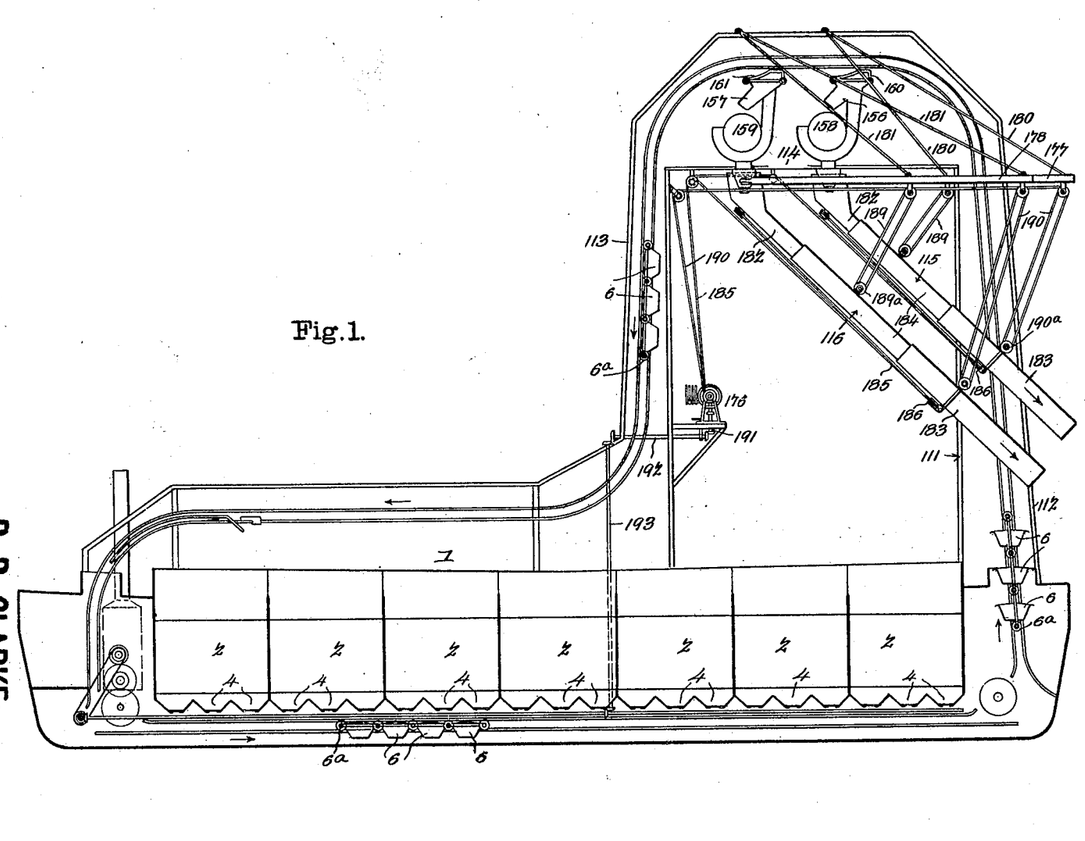
Figure 1 is a diagrammatic longitudinal sectional view of a barge provided with a winch constructed in accordance with this invention.

1 designates a barge provided with a longitudinal series of bins or compartments 2, having depending hoppers 4, and the latter are provided with suitable cut-offs adapted to be opened to permit coal or other material to be discharged from the bins or compartments into buckets 6 of an endless conveyer $6^a$. The barge is provided at its front portion with a tower 111, composed of front and rear sides 112 and 113, spaced apart and connected by a horizontal top portion 114. The front side or leg 112 of the tower is located at the bow of the barge, and the rear side or leg 113 is located at a point slightly in advance of the center of the same, ample space being provided between the sides or legs of the tower to enable a pair of extensible telescoping chutes 115 and 116 to swing from one side of the barge to the other. The endless conveyer $6^a$ is composed of a horizontal flight located beneath the bins or compartments, an ascending flight located at the front side or leg of the tower, and a descending flight supported by the rear leg and extending to the back of the barge. The endless conveyer is also provided with a short horizontal flight arranged at the top of the tower. The loaded buckets ascend the front side of the tower and in their passage across the top of the latter are dumped into hoppers 156 and 157 of scale-cases 158 and 159 by dumping-blocks 160 and 161.

Figure 7:
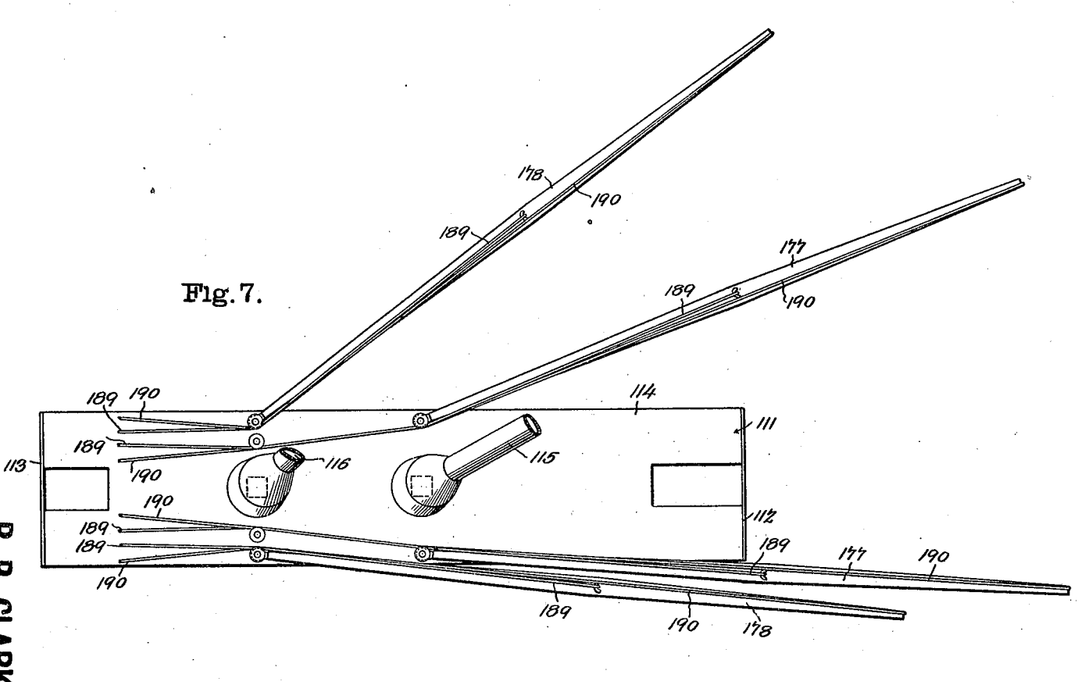
Fig. 7 is an enlarged view illustrating the arrangement of the chutes and the booms.
Figure 11:
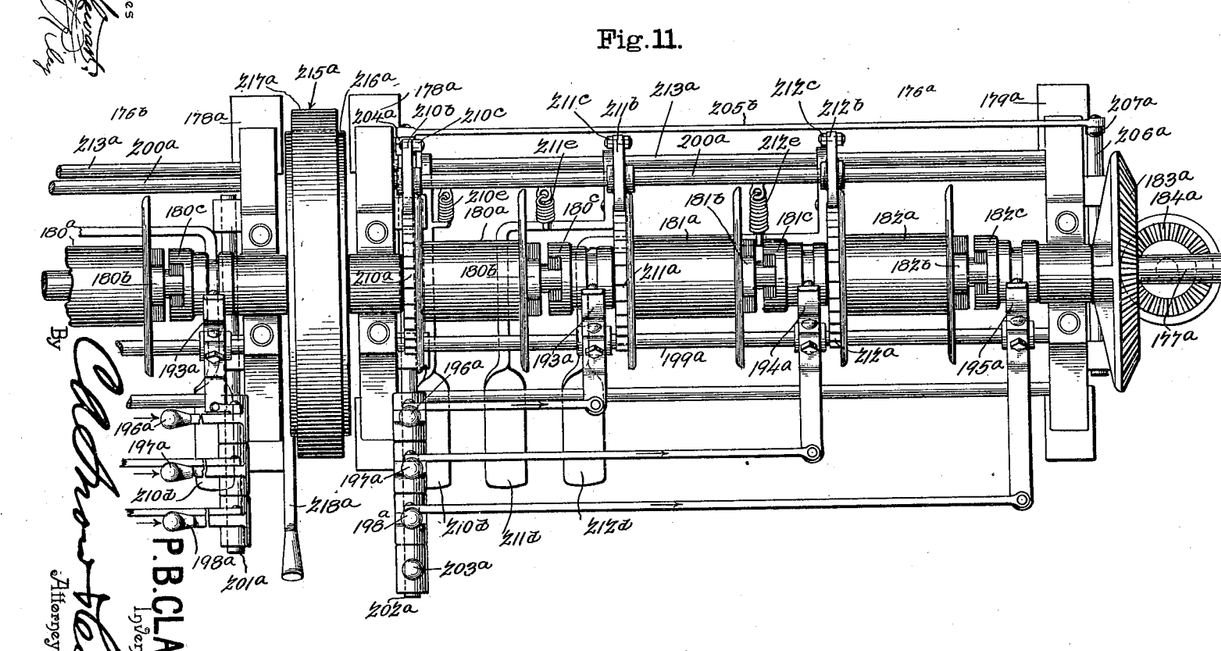
Fig. 11 is a plan view of the winch.

The scale-casings are designed to receive rotary scales for weighing the material, and they are provided with tapered lower portions forming spouts and communicating with depending rotary sleeves or collars 174, to which the extensible telescoping chutes 115 and 116 are connected by suitable pivots 175. The chutes 115 and 116, which are adapted to operate at either the starboard or the port side of the barge, may be swung through the open space between the front and rear sides or legs of the tower, and they are controlled by suitable ropes or cables connected with a winch 176 and with booms 177 and 178, arranged in pairs at opposite sides of the tower, as clearly illustrated in Fig. 7 of the accompanying drawings. The booms, which swing in horizontal planes, are supported in a horizontal position by guy ropes or cables 180 and 181 and are pivoted or hinged at their inner ends to the tower at the top thereof. The chutes, which have enlarged upper ends, are composed of upper, lower, and intermediate sections 182, 183, and 184, and the lower and intermediate sections 183 and 184 are adapted to slide or telescope on each other and on the upper section to vary the length of the chutes. The telescoping movement of the sections is controlled by a rope or line 185, secured at its outer end to the upper or top section of the chute and extending longitudinally of the latter to a pulley 186 of the lower or bottom section 183 and passing therefrom backward longitudinally of the chute and extending over suitable guide-pulleys to the winch. The superimposed chutes are located one in advance of the other, and the guide-pulleys for conducting the lines or ropes to the winch may be arranged in any suitable manner.

The intermediate and lower sections of the chutes are connected with the booms by means of ropes or lines 189 and 190. The rope or cable 189 is connected at one end to the adjacent boom at a point intermediate of the ends thereof, and it extends downward to the intermediate section 184 and back to the boom to form a supporting-loop. This rope or line 189 then extends inward longitudinally of the boom to the tower, and it passes downward to the winch 176, suitable pulleys or blocks being arranged on the booms and on the tower for the ropes or lines, which are connected to the intermediate sections 184. The other rope or line 190 of each chute is arranged at the outer end of the boom and is connected with the latter and with the lower section of the chute to form a depending loop, and it extends over suitable pulleys to the winch. The depending loops of the ropes or lines 189 and 190 are provided at their bottoms with suitable blocks 189$^a$ and 190$^a$, having pulleys and provided with hooks for detachably engaging eyes of the lower and intermediate sections of the chutes, whereby the latter may be readily coupled to the ropes or lines of either pair of booms.

Figure 4:
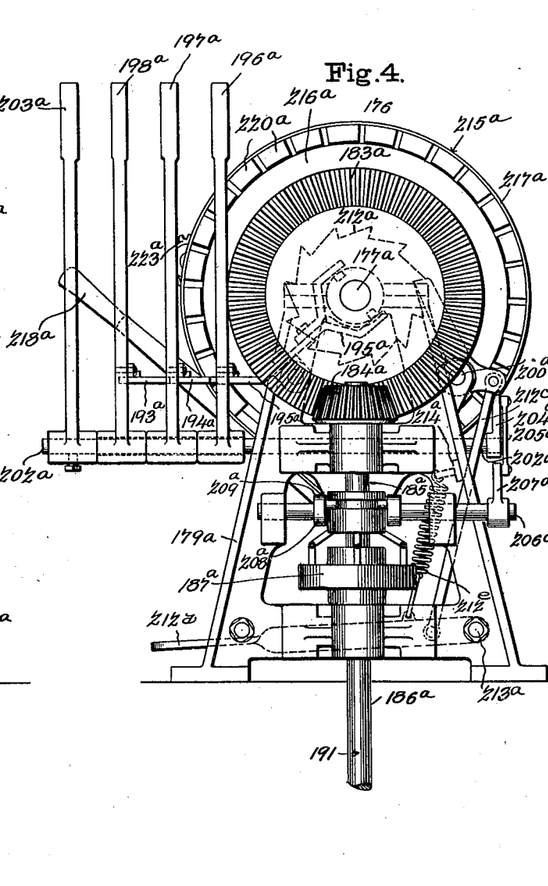
Fig. 4 is an end elevation of the same.
Figure 5:
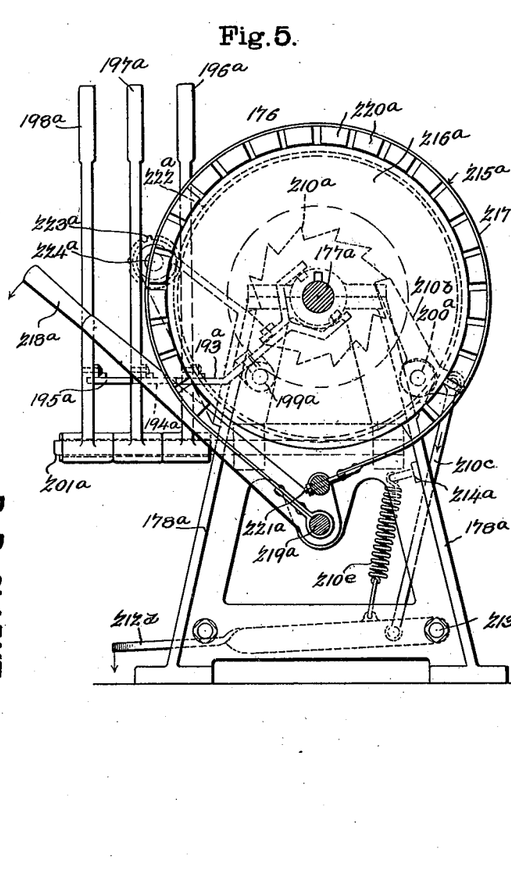
Fig. 5 is a vertical sectional view on the line 5 5 of Fig. 3.
Figures 6, 9, 10, 12:
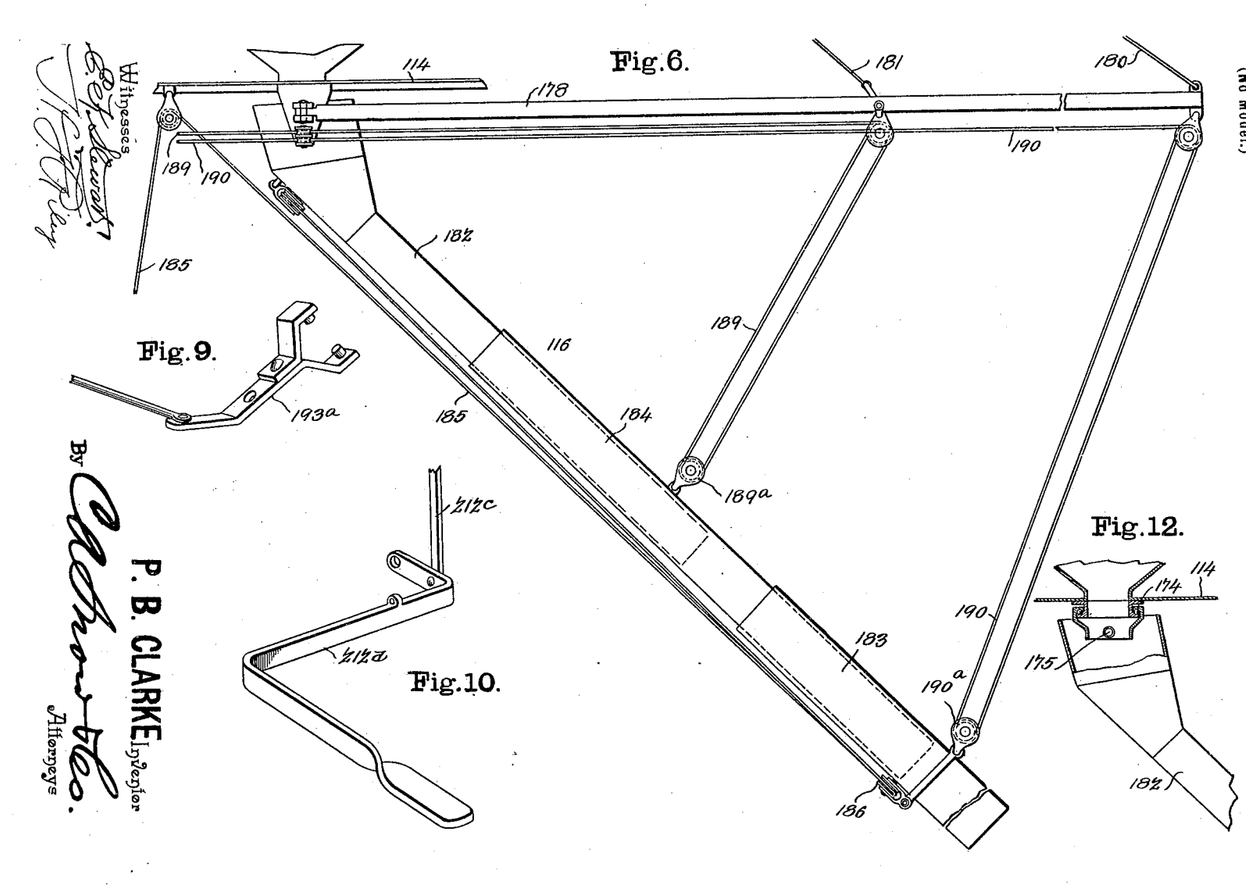

The winch 176, which is composed of two sections 176$^a$ and 176$^b$, is provided with a continuous horizontal shaft 177$^a$, journaled in suitable bearings of inner and outer standards 178$^a$ and 179$^a$, arranged in pairs and located at the inner and outer ends of the sections of the winch. The inner and outer standards 178$^a$ and 179$^a$, which may be of any desired construction, are preferably approximately A-shaped, as clearly illustrated in Figs. 4 and 5 of the accompanying drawings, and the horizontal shaft 177$^a$ supports two sets of drums, each set comprising an inner drum 180$^a$, an intermediate drum 181$^a$, and an outer drum 182$^a$, as clearly shown in Fig. 2. One end of the horizontal winch-shaft 177$^a$ is provided with a vertical gear-wheel 183$^a$, having bevel-teeth and meshing with bevel-pinion 184$^a$, arranged horizontally at the upper end of an upper section 185$^a$ of a vertical shaft 191, and the latter is also provided with a lower section 186$^a$, the two sections being connected by a clutch 187$^a$. The lower end of the vertical shaft 191 is connected by bevel-gearing with a horizontal shaft 192, and the latter extends from the short vertical shaft 191 to a long vertical shaft 193, which passes downward to the bottom of the barge and which has its lower end connected with suitable gearing extending to an engine or other motive power for operating the winch. The clutch, which may be constructed in any suitable manner, is composed of two sections connected with the upper and lower sections of the vertical shaft 191, and when the two sections of the clutch 187$^a$ are in contact with each other the upper and lower sections of the vertical shaft 191 are coupled. When it is desired to operate the winch, the movable section of the clutch 187 is carried into engagement with the other section of the clutch by the means hereinafter described to couple the two sections of the shaft 191, and motion is thereby communicated to the horizontal winch-shaft. The lower section 186$^a$ of the vertical shaft 191 is designed to be continuously rotated, so that the winch may be set in motion at any time; but any other construction and arrangement of gearing may be employed for actuating the horizontal winch-shaft.

The inner drums 180$^a$ of the two sets or series are designed to be connected with the ropes or lines which extend through the lower sections of the chutes and which control the telescoping of the sections to vary the length of the chutes, and the intermediate and outer drums 181$^a$ and 182$^a$ are connected with the inner and outer lines or ropes 189 and 190 of the booms to which the chutes are connected, and these lines are detachably coupled to the drums to enable the lines or ropes of either set of booms to be attached to the winch. Each drum is provided at one of its end flanges with a keyhole-slot 191$^a$, and each line or rope is provided with a ball 192$^a$, adapted to be passed through the enlarged portion of the keyhole-slot to permit the line or rope to be drawn into the narrow portion of the slot. The drum is then rotated to wind the line or rope on it, and after a coil or two of the rope is on the drum the ball is prevented from becoming accidentally disengaged from the keyhole slot or opening. When the ropes or lines of one set of booms are in use, those of the other set of booms are coiled and hung upon suitable supports near the winch, so that they will be within convenient reach when it is desired to change the chutes and arrange them at the other side of the barge.

The inner, intermediate, and outer drums are provided with clutch-faces 180$^b$, 181$^b$, and 182$^b$, which are adapted to be engaged by sliding clutch-sections 180$^c$, 181$^c$, and 182$^c$, slidingly connected with the winch-shaft by means of a feather or key and capable of independent movement, whereby any one of the drums may be coupled to the winch-shaft. The sliding clutch-sections 180$^c$, 181$^c$, and 182$^c$ are provided with annular grooves and are engaged by projections of yokes of inner, intermediate, and outer levers 193ª, 194ª, and 195ª, fulcrumed between their ends on suitable supports and connected by longitudinal rods with inner, intermediate, and outer operating-levers 196ª, 197ª, and 198ª, arranged in sets and located at the inner ends of the sections of the winch. The clutch-engaging levers 193ª, 194ª, and 195ª are supported by a longitudinal rod 199ª, connecting the standards and located at one side of the winch. The other sides of the standards are connected by a longitudinal rod 200ª, and these rods coöperate with the standards to form the frame of the winch. The two sets of clutch-operating levers are located at the inner ends of the sections of the winch and are fulcrumed at their lower ends on a transverse rod 201ª and a transverse shaft 202ª, which consists of a rod arranged similarly to the rod 201ª. The longitudinal connecting-rods, which extend from the clutch-operating levers, vary in length and are arranged parallel with each other, and the inner, intermediate, and outer clutch-engaging levers 193ª, 194ª, and 195ª gradually increase in length and extend outward to their respective connecting-rods. The transverse shaft 202ª is provided with an operating lever or handle 203ª, arranged similar to the clutch-operating levers, and the other end of the transverse shaft is provided with a short arm 204ª, connected by a longitudinal rod 205ª with a tranverse rock-shaft 206ª. The transverse rock-shaft 206ª forms a bell-crank connection and is provided at one end with an arm 207ª, and it has a pair of intermediate arms 208ª located at opposite sides of a sliding sleeve 209ª and provided with projections engaging an annular groove of the said sleeve 209ª. The sleeve 209ª is mounted on the upper section of the vertical shaft 191 and is connected with the adjacent section of the clutch 187ª, and when the transverse shaft 206ª is rocked by the operating-lever 203ª the sleeve 209ª will be raised or lowered and the upper section of the clutch 187ª will be carried into or out of engagement with the lower section of such clutch, according to the direction of the movement of the said operating-lever 203ª. The transverse rock-shaft 206ª, which is located at one end of the winch, is journaled in suitable bearings of the adjacent standard and has its outer arm arranged at right angles to the intermediate clutch-engaging arms 208ª.

The keyhole slots or openings are located at one end of each drum, and the other ends of the drums are provided with ratchet-wheels 210ª, 211ª, and 212ª, preferably consisting of annular series of integral ratchet-teeth and engaged by locking pawls or levers 210ᵇ, 211ᵇ, and 212ᵇ, fulcrumed or pivoted between their ends on the longitudinal rod 200ª and extending upward therefrom and arranged to engage the ratchet-wheels of the inner, intermediate, and outer drums. The lower arms of the locking pawls or levers are shorter than the upper arms and are connected by rods 210ᶜ, 211ᶜ, and 212ᶜ with foot-levers 210ᵈ, 211ᵈ, and 212ᵈ, fulcrumed at their rear ends on a longitudinal rod 213ª and provided at their front ends with horizontal portions arranged to be engaged by the foot of the operator. The levers 211ᵈ and 212ᵈ are angularly bent between their ends to arrange their front ends adjacent to the front end of the lever 210ᵈ, so that any one of the levers may be readily depressed by the operator when the latter is at the center of the winch. The rods are connected with the foot-levers, near the rear ends thereof, and the locking pawls or levers are maintained normally in engagement with the ratchet-wheels of the drums by coiled springs 210ᵉ, 211ᵉ, and 212ᵉ, connected with the levers and with a longitudinal bar 214ª of the winch. The bar 214ª is located at a point between the top and bottom of the standards, and it assists in supporting the same.

Figure 2:
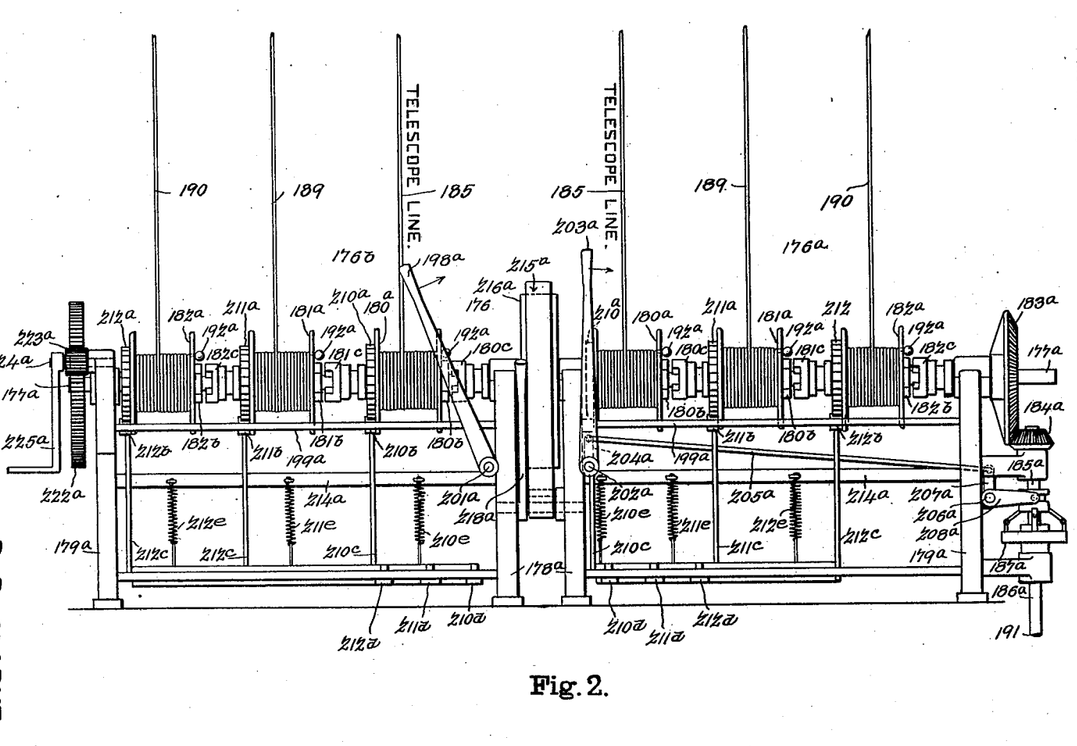
Fig. 2 is a front elevation of the winch.
Figures 3, 8:
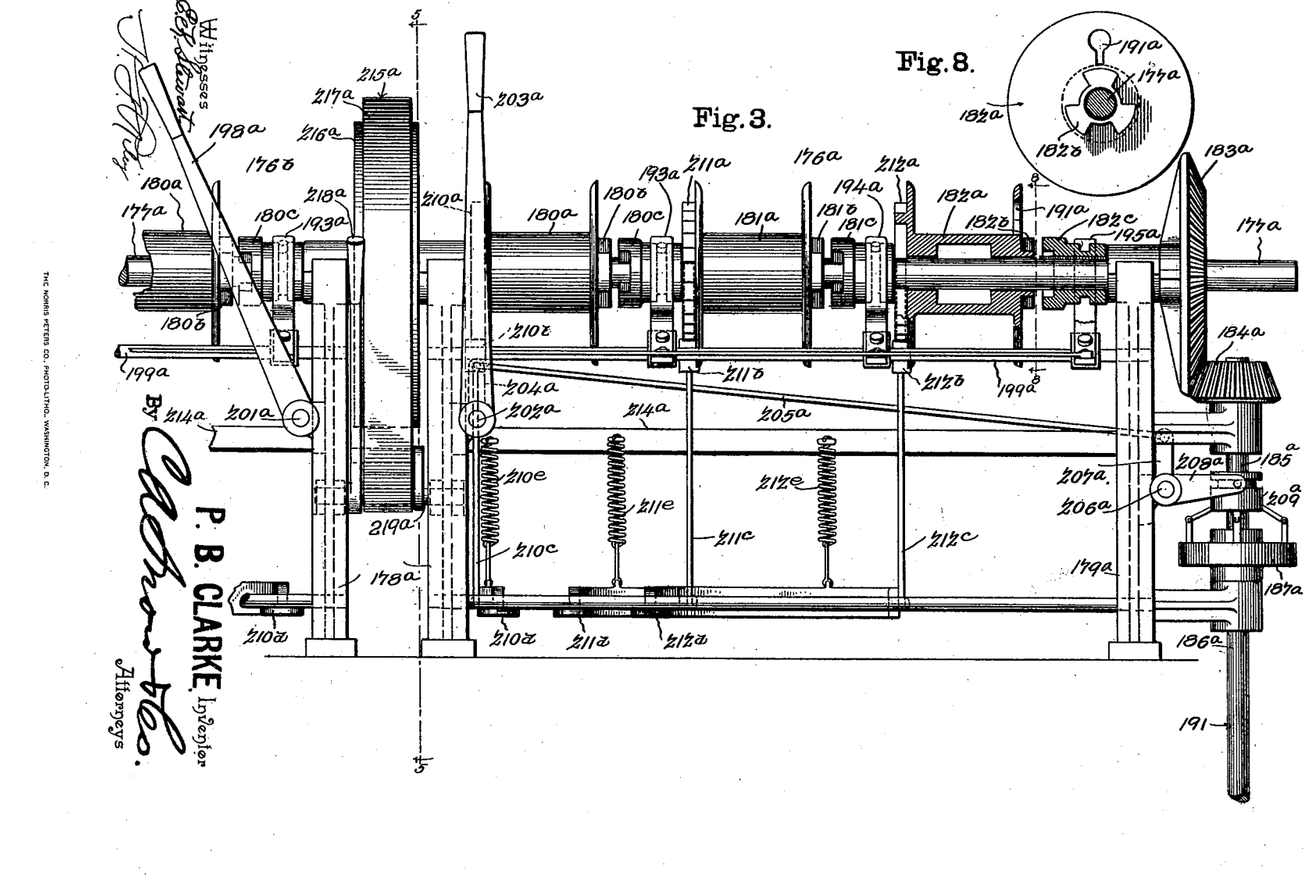
Fig. 3 is an enlarged elevation, partly in section, of a portion of the winch.
Fig. 8 is a detail sectional view on the line 8 8 of Fig. 3.

The clutch-operating levers are moved in the direction of the arrows in Fig. 2 of the drawings to carry the sliding clutch-sections into engagement with the drums, and the series of clutch-operating levers of the section 176ᵇ of the winch is normally arranged in a vertical position and the clutch-operating levers of the section 176ª of the winch are arranged at a slight inclination and are adapted to be moved toward the center of the winch to carry the corresponding clutch-sections into engagement with their respective drums. When it is desired to operate any one of the drums which are loose on the horizontal winch-shaft, the clutch-operating lever of the drum is actuated to couple such drum to the winch-shaft, and the latter is set in motion by means of the operating-lever 203ª, which operates the clutch 187ª and couples together the upper and lower sections of the vertical shaft 191. The drum will then be rotated and the line connected with it will be wound up. By this construction the chutes may be hoisted to the desired elevation. The weight of the chutes will automatically unwind the lines or ropes of the drums of the winch when the latter is arranged for such operation. When it is desired to unwind a rope or line from a drum, the latter is coupled to the winch-shaft and its pawl or locking lever is thrown out of engagement with its ratchet by depressing the corresponding foot-lever. The descent of the chute is controlled by means of a band-brake 215ª, consisting of a brake-wheel 216ª, a strap or band 217ª, and a brake-lever 218ª. The brake-wheel, which is located at the center of the horizontal winch-shaft, is arranged between the inner standards 178ª, and the strap or band 217ª, which has one end fixed to a longitudinal rod 219ª, is provided at intervals with a series of brake-shoes 220ª, located at the inner face of the band and arranged to engage the periphery of the brake-wheel. The other end of the strap or band is connected to the brake-lever 218ᵃ at a point adjacent to the longitudinal rod or pivot 219ᵃ, and the lever 218ᵃ is adapted to be swung downward to draw the band around the brake-wheel and carry the brake-shoes into engagement with the same. The longitudinal rod or pivot 219ᵃ extends across the space between the inner standards 178ᵃ, and the lever 218ᵃ is provided with a lateral projection to receive a bolt or fastening device 221ᵃ of the adjacent end of the band. The fastening device 221ᵃ extends through a perforation of the lateral projection of the lever and is provided with a nut for engaging the same, as clearly illustrated in Fig. 5 of the accompanying drawings. The band-brake has sufficient power to control the descent of the chutes, which may be lowered slowly and freely. The horizontal winch-shaft is provided at its end opposite that at which the bevel gear-wheel 183ᵃ is located with a spur gear-wheel 222ᵃ, keyed or otherwise secured to the horizontal winch-shaft and meshing with a pinion 223ᵃ of a short shaft 224ᵃ, which is provided with a crank-handle 225ᵃ. This gearing is adapted to be operated by hand and will enable the chutes to be adjusted when there is no steam or other motive power in the barge. By this construction the position of the chutes may be changed while getting up steam on the barge.

It will be seen that the winch is simple and comparatively inexpensive in its construction, that one or more of the drums may be coupled to the winch-shaft, and that the said drums are adapted to be operated independently of one another to wind up or pay out a rope or line. It will also be apparent that the winch may be actuated by hand or by steam or other power, and that in unwinding a line the descent of a chute is controlled by the brake.

What I claim is—

1. In a winch, the combination of a winch-shaft, a plurality of drums arranged on the winch-shaft and provided with clutch-faces and having ratchet-wheels, clutch-sections slidingly mounted on the winch-shaft and arranged to engage the clutch-faces of the drums, clutch-operating levers connected with and adapted to actuate the clutches independently of one another, means for operating the winch-shaft, and a brake for controlling the rotation of the winch-shaft for unwinding ropes or lines from the drums, and pawls engaging the ratchet-wheels of the drums, substantially as described.

2. In a winch, the combination of a frame, a winch-shaft, a series of drums mounted on the winch-shaft and provided with clutch-faces and having ratchet-wheels, sliding clutch-sections mounted on the winch-shaft and arranged to engage the clutch-faces of the drums, pawls for engaging the ratchet-wheels, clutch-engaging levers connected with and adapted to slide the clutch-sections into and out of engagement with the drums and varying in length, a transverse series of clutch-operating levers, and connections between the clutch-operating levers and the clutch-engaging levers, substantially as described.

3. In a winch, the combination of a frame, a winch-shaft, a series of drums loosely mounted on the winch-shaft, sliding clutch-sections mounted on the winch-shaft and arranged to engage the drums, a shaft 191 composed of sections, a clutch 187ᵃ for connecting the sections of the shaft 191, gearing connecting the winch-shaft with the adjacent section of the shaft 191, a transverse shaft, connections between the transverse shaft and the clutch 187ᵃ, and a series of clutch-operating levers fulcrumed on the transverse shaft and connected with the clutch-sections of the winch-shaft, substantially as described.

4. In a winch, the combination of a frame, a winch-shaft having a plurality of drums, sliding clutch-sections mounted on the winch-shaft and arranged to engage the drums, a shaft 191 composed of two sections, gearing connecting the said shafts, a clutch 187ᵃ for coupling the sections of the shaft 191, a rock-shaft provided with arms connected with the clutch 187ᵃ and adapted to actuate the latter, a transverse shaft connected with the rock-shaft, and a series of clutch-operating levers connected with the sliding clutch-sections of the winch-shaft, substantially as described.

5. In a winch, the combination of a frame, a horizontal winch-shaft, a plurality of drums mounted on the winch-shaft, sliding clutch-sections carried by the winch-shaft and arranged to engage the drums, a shaft 191, located at one end of the winch-shaft and composed of sections, a clutch 187ᵃ for connecting the sections of the shaft 191, a rock-shaft provided at one end with an arm and having a pair of intermediate arms connected with the clutch 187ᵃ, a transverse shaft provided with an arm connected with the end arm of the rock-shaft, and a series of operating-levers fulcrumed on the transverse shaft and connected with the sliding clutch-sections, substantially as described.

6. In a winch, the combination of a frame, a horizontal winch-shaft, a series of drums loosely arranged on the winch-shaft and provided with ratchet-teeth, sliding clutch-sections mounted on the winch-shaft and arranged to engage the drums, a series of clutch-operating levers located at one end of the series of drums and connected with the sliding clutch-sections, pawls arranged at intervals and engaging the ratchet-wheels of the drums, foot-levers having their outer portions located adjacent to the clutch-operating levers and extending to points beneath the said pawls and connected with the same, and springs for holding the pawls in engagement with the ratchet-wheels, substantially as described.

7. In a winch, the combination of a frame, a winch-shaft, a series of drums mounted on the winch-shaft and provided with ratchet-wheels and having clutch-faces, sliding clutch-sections mounted on the winch-shaft and arranged to engage the drums, a series of clutch-operating levers located at one end of the series of drums, the clutch-engaging levers connected with the sliding clutch-sections and gradually increasing in length from the inner end of the series of drums and connected with the clutch-operating levers, pawls arranged at intervals and engaging the ratchet-wheels, and the foot-levers having their outer ends arranged contiguous to the clutch-operating levers and extending therefrom to points beneath the pawls and connected with the latter, substantially as described.

8. In a winch, the combination of a frame, a horizontal winch-shaft, a band-brake arranged between the ends of the shaft, the drums arranged in series and located at opposite sides of the band-brake, independent clutches arranged to engage the drums for coupling the same to the shafts, the clutch-operating levers located adjacent to the band-brake and connected with the said clutches, pawls for locking the drums against backward movement, and foot-levers having their outer portions arranged adjacent to the band-brake, said foot-levers being connected with the said pawls, substantially as described.

9. In a winch, the combination of a frame, a horizontal winch-shaft, a brake connected with the shaft at a point between the ends thereof, the drums loosely mounted on the winch-shaft and located at opposite sides of the brake, clutches for engaging the drums, the transverse series of clutch-operating levers located at opposite sides of the brake and connected with the clutches, locking mechanism for holding the drums against retrograde rotation, and foot-levers arranged in sets at opposite sides of the brake and connected with the locking mechanism and adapted to release the drums, substantially as described.

In testimony that I claim the foregoing as my own I have hereto affixed my signature in the presence of two witnesses.

PEETE B. CLARKE.

Witnesses:
  JOHN FRENCH,
  CHARLES ENGEL.